Figure 1:
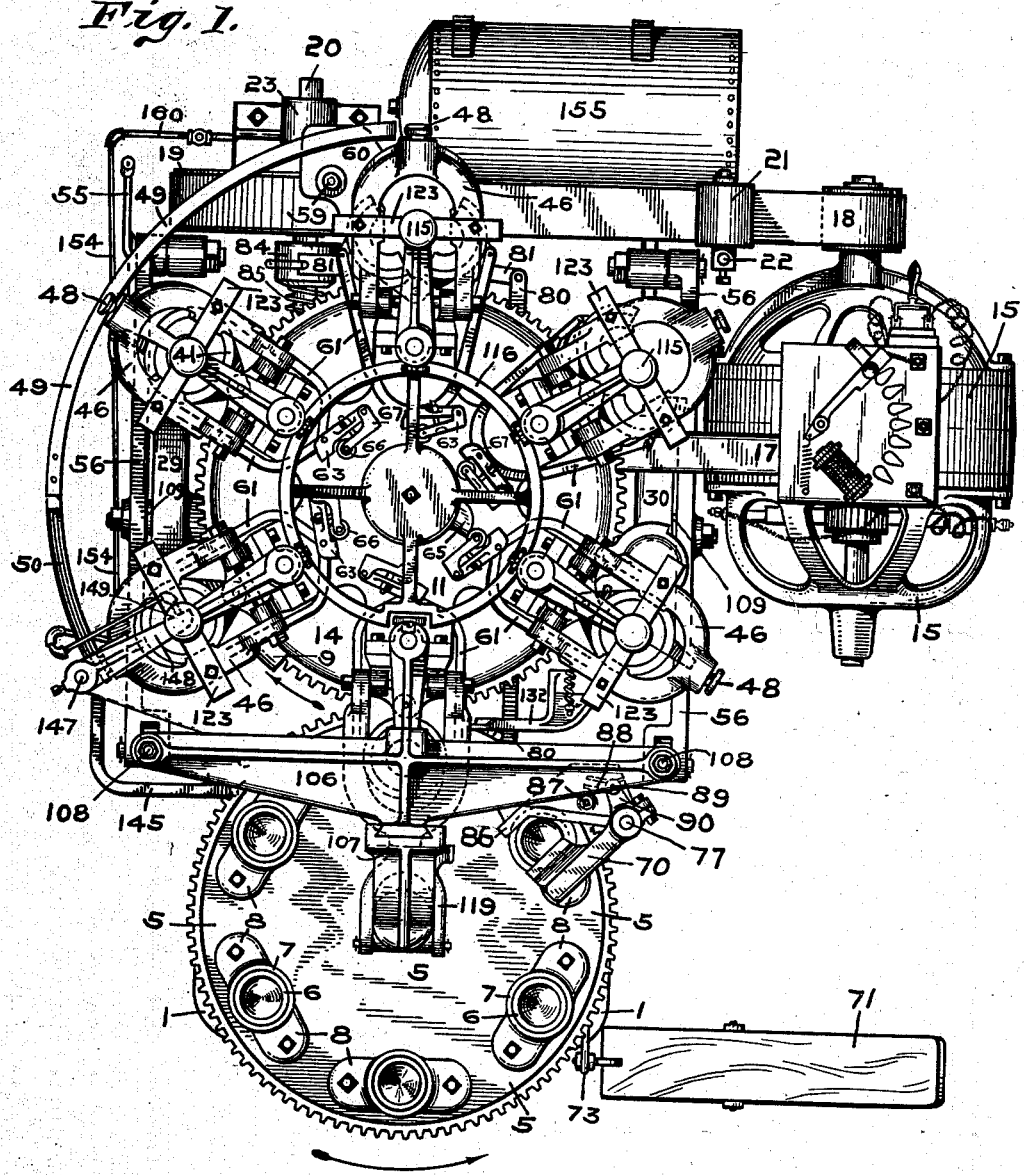

No. 714,396.   Patented Nov. 25, 1902.
G. C. PYLE.
MACHINE FOR MAKING HOLLOW GLASSWARE.
(Application filed Aug. 26, 1901.)

(No Model.)   12 Sheets—Sheet 1.

WITNESSES:   INVENTOR.
F. W. Woerner.   George C. Pyle
Florence E. Bryant.   BY V. H. Lockwood
   ATTORNEY.

No. 714,396. Patented Nov. 25, 1902.
G. C. PYLE.
MACHINE FOR MAKING HOLLOW GLASSWARE.
(Application filed Aug. 26, 1901.)
(No Model.) 12 Sheets—Sheet 4.

WITNESSES: INVENTOR.
George C. Pyle
BY
V. H. Lockwood
ATTORNEY.

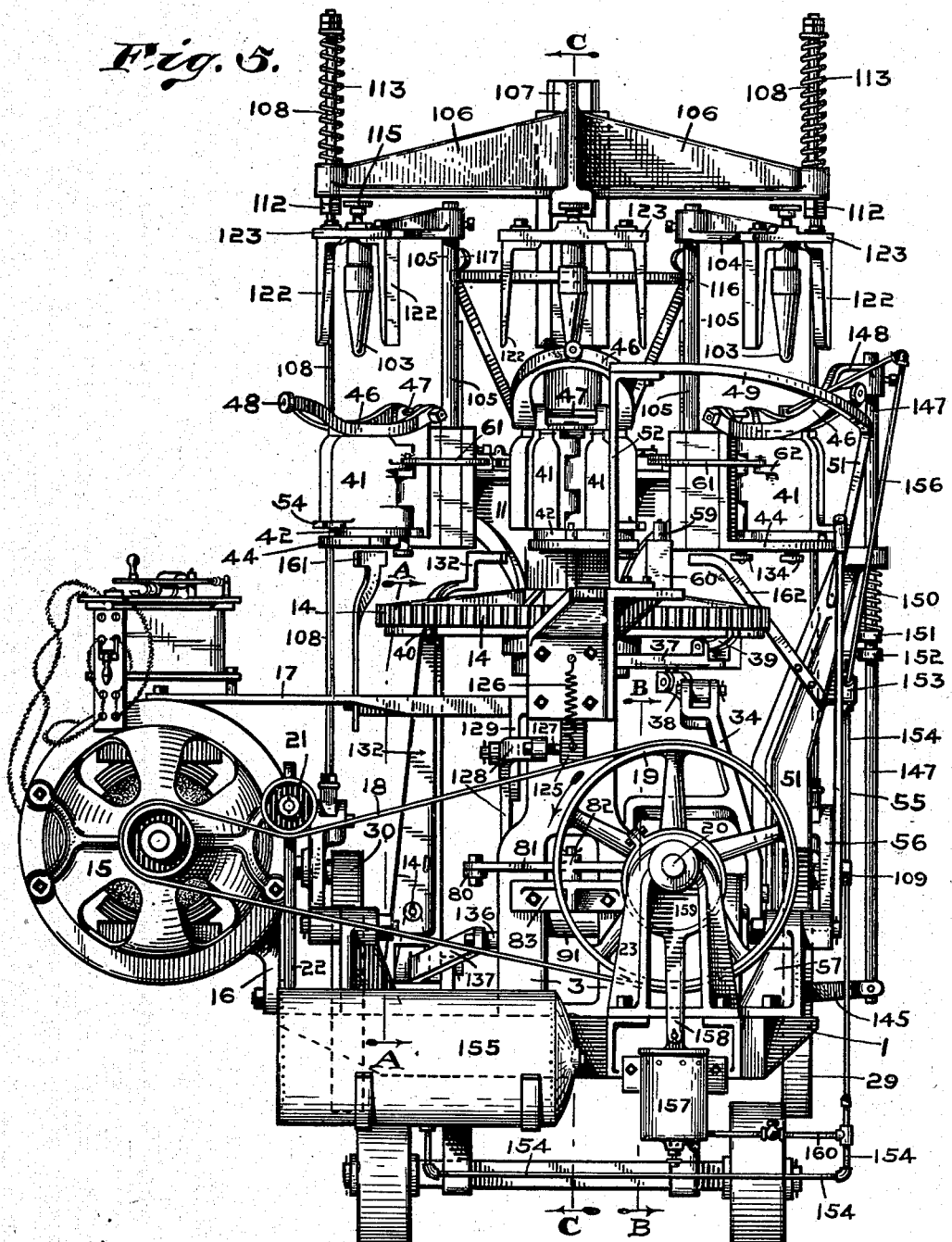

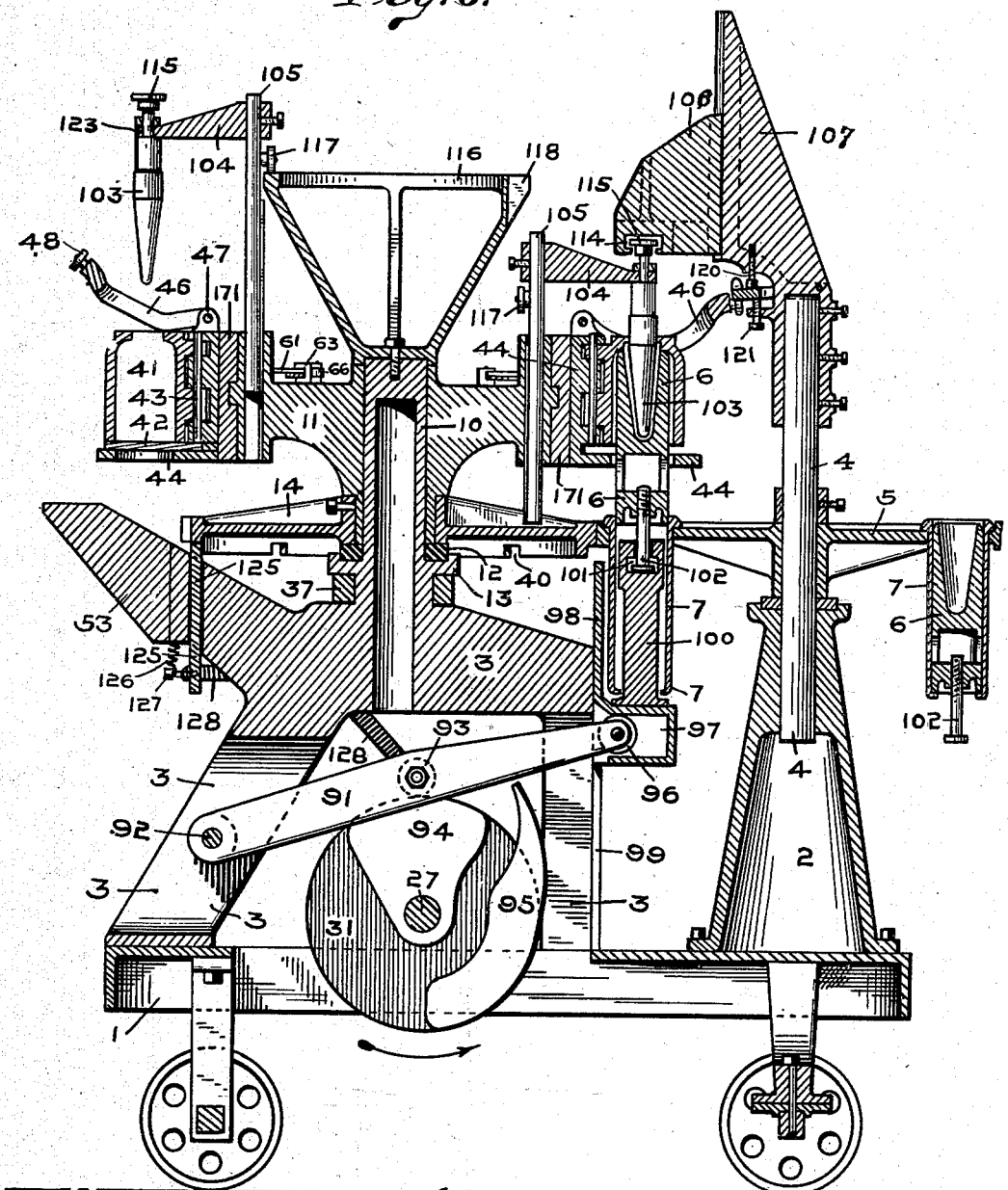

No. 714,396. Patented Nov. 25, 1902.
G. C. PYLE.
MACHINE FOR MAKING HOLLOW GLASSWARE.
(Application filed Aug. 26, 1901.)
(No Model.) 12 Sheets—Sheet 7.
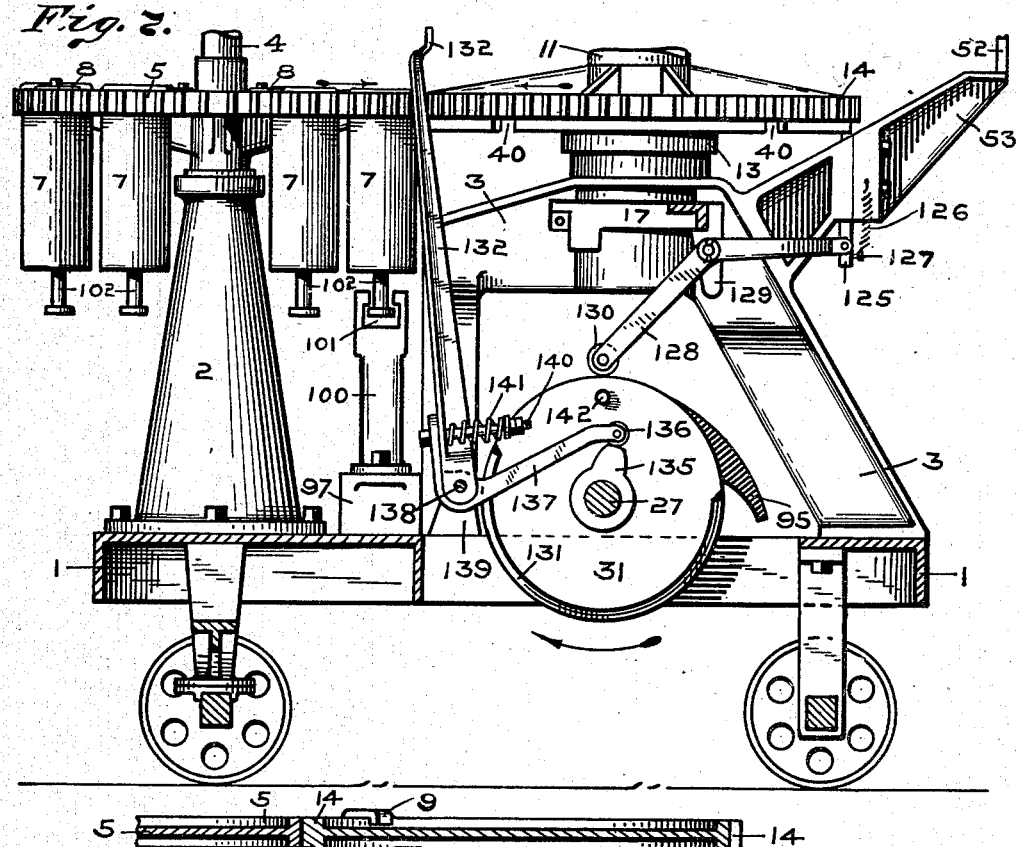
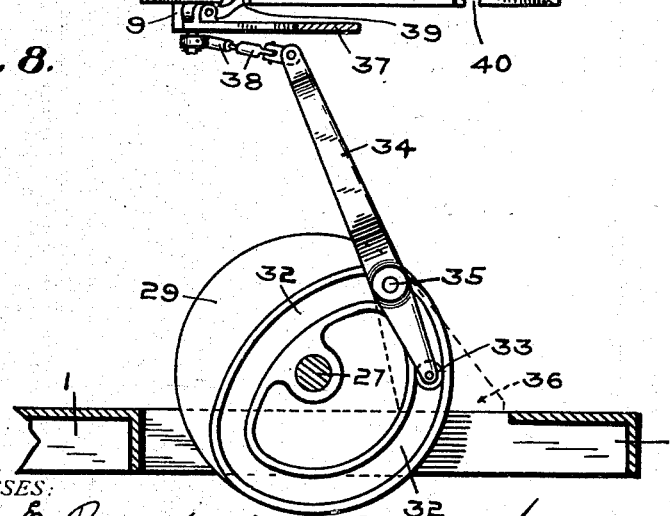
WITNESSES:
Florence E. Bryant.
F. W. Woerner.
INVENTOR.
George C. Pyle.
BY
V. H. Lockwood,
ATTORNEY.

No. 714,396. Patented Nov. 25, 1902.
G. C. PYLE.
MACHINE FOR MAKING HOLLOW GLASSWARE.
(Application filed Aug. 26, 1901.)
(No Model.) 12 Sheets—Sheet 8.

WITNESSES:
F. E. Bryant.
F. W. Woerner.

INVENTOR.
George C. Pyle
BY
V. H. Lockwood.
ATTORNEY.

No. 714,396. Patented Nov. 25, 1902.
G. C. PYLE.
MACHINE FOR MAKING HOLLOW GLASSWARE.
(Application filed Aug. 26, 1901.)
(No Model.) 12 Sheets—Sheet 9.

WITNESSES: INVENTOR.
Florence E. Bryant. George C. Pyle,
BY
F. W. Woerner. V. H. Lockwood,
ATTORNEY.

No. 714,396. Patented Nov. 25, 1902.
G. C. PYLE.
MACHINE FOR MAKING HOLLOW GLASSWARE.
(Application filed Aug. 26, 1901.)
(No Model.) 12 Sheets—Sheet 10.

WITNESSES: Florence E. Bryant. F. W. Woerner.

INVENTOR. George C. Pyle
BY V. H. Lockwood
ATTORNEY.

No. 714,396. Patented Nov. 25, 1902.
G. C. PYLE.
MACHINE FOR MAKING HOLLOW GLASSWARE.
(Application filed Aug. 26, 1901.)
(No Model.) 12 Sheets—Sheet 11.

WITNESSES:
Florence E. Bryant.
F. W. Woerner.

INVENTOR.
George C. Pyle
BY
V. H. Lockwood.
ATTORNEY.

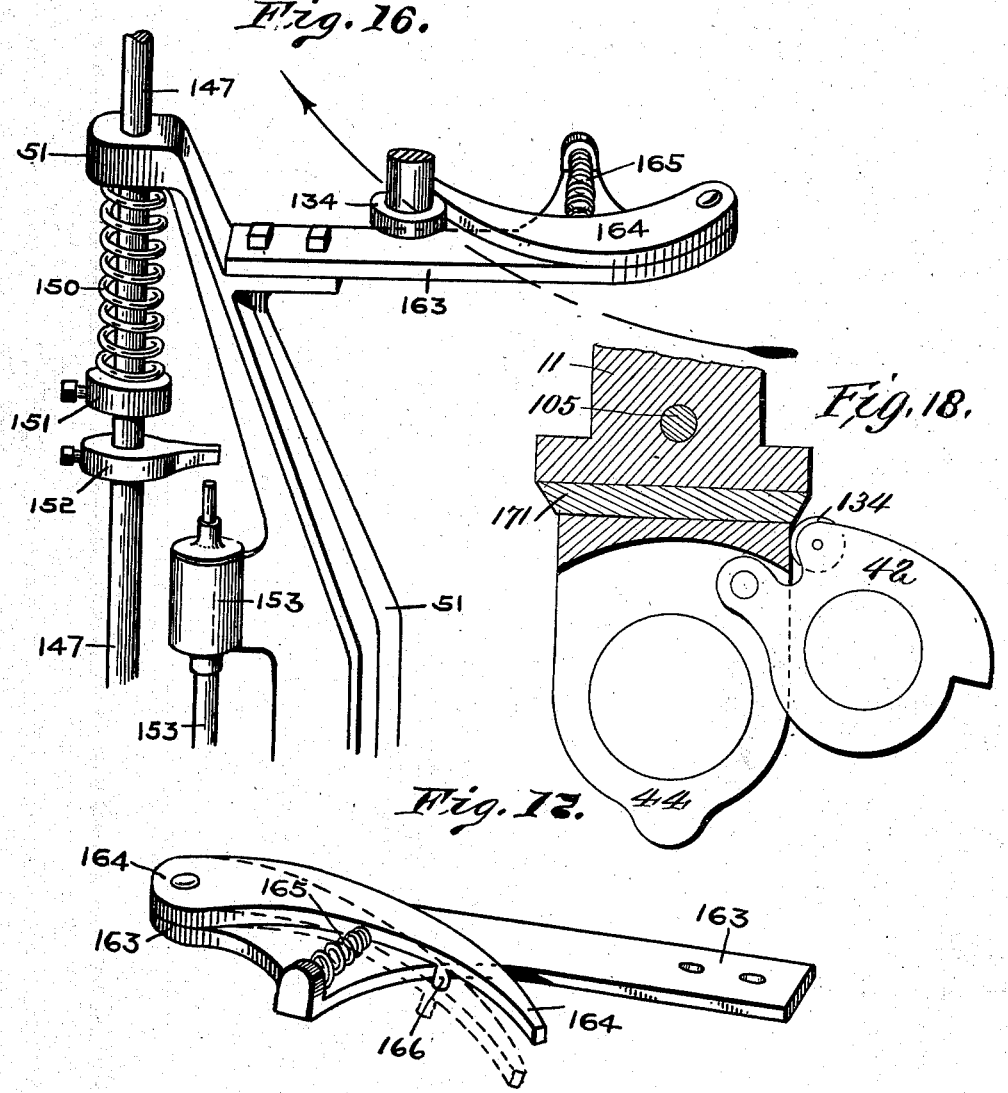

UNITED STATES PATENT OFFICE.

GEORGE C. PYLE, OF INDIANAPOLIS, INDIANA.

MACHINE FOR MAKING HOLLOW GLASSWARE.

SPECIFICATION forming part of Letters Patent No. 714,396, dated November 25, 1902.

Application filed August 26, 1901. Serial No. 73,385. (No model.)

*To all whom it may concern:*

Be it known that I, GEORGE C. PYLE, of Indianapolis, county of Marion, and State of Indiana, have invented a certain new and useful Machine for Making Hollow Glassware; and I do hereby declare that the following is a full, clear, and exact description thereof, reference being had to the accompanying drawings, in which like numerals refer to like parts.

The object of this invention is to improve the construction of the machines for making hollow glass articles, which do all the work automatically, except charging the machine with glass and removing the finished articles therefrom. Machines of this type and upon which the inventions herein are improvements are shown and described in former Letters Patent of the United States granted to me for machines for making hollow glassware, as follows: No. 647,276, dated April 10, 1900; No. 650,655, dated May 29, 1900; No. 668,858, dated February 26, 1901; No. 672,987, dated April 30, 1901, and No. 675,166, dated May 28, 1901.

The nature of my improvements, as well as the construction and mode of operation of the machine, will be understood from the accompanying drawings and the following description and claims.

Figure 2:
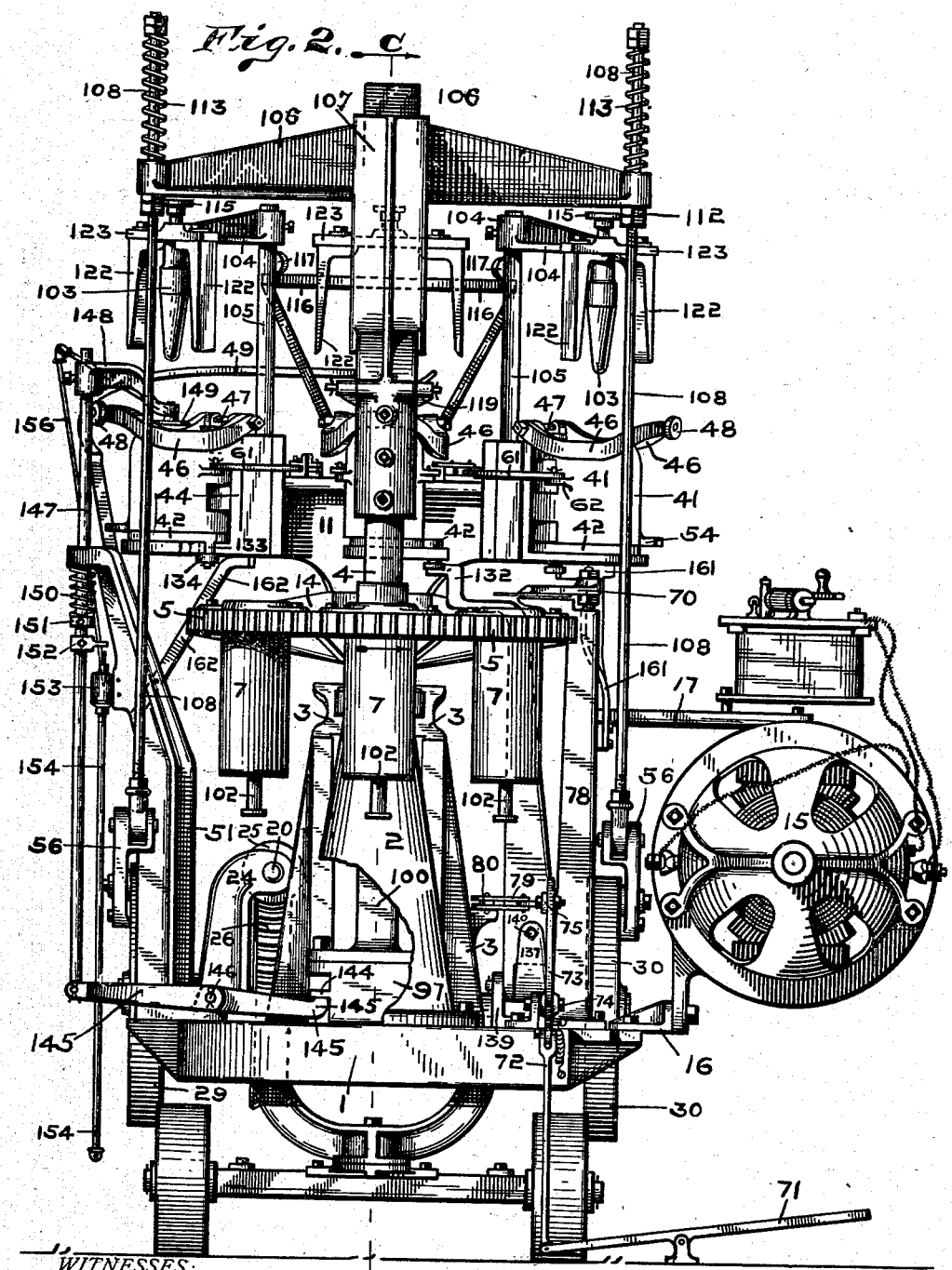
Figure 3:
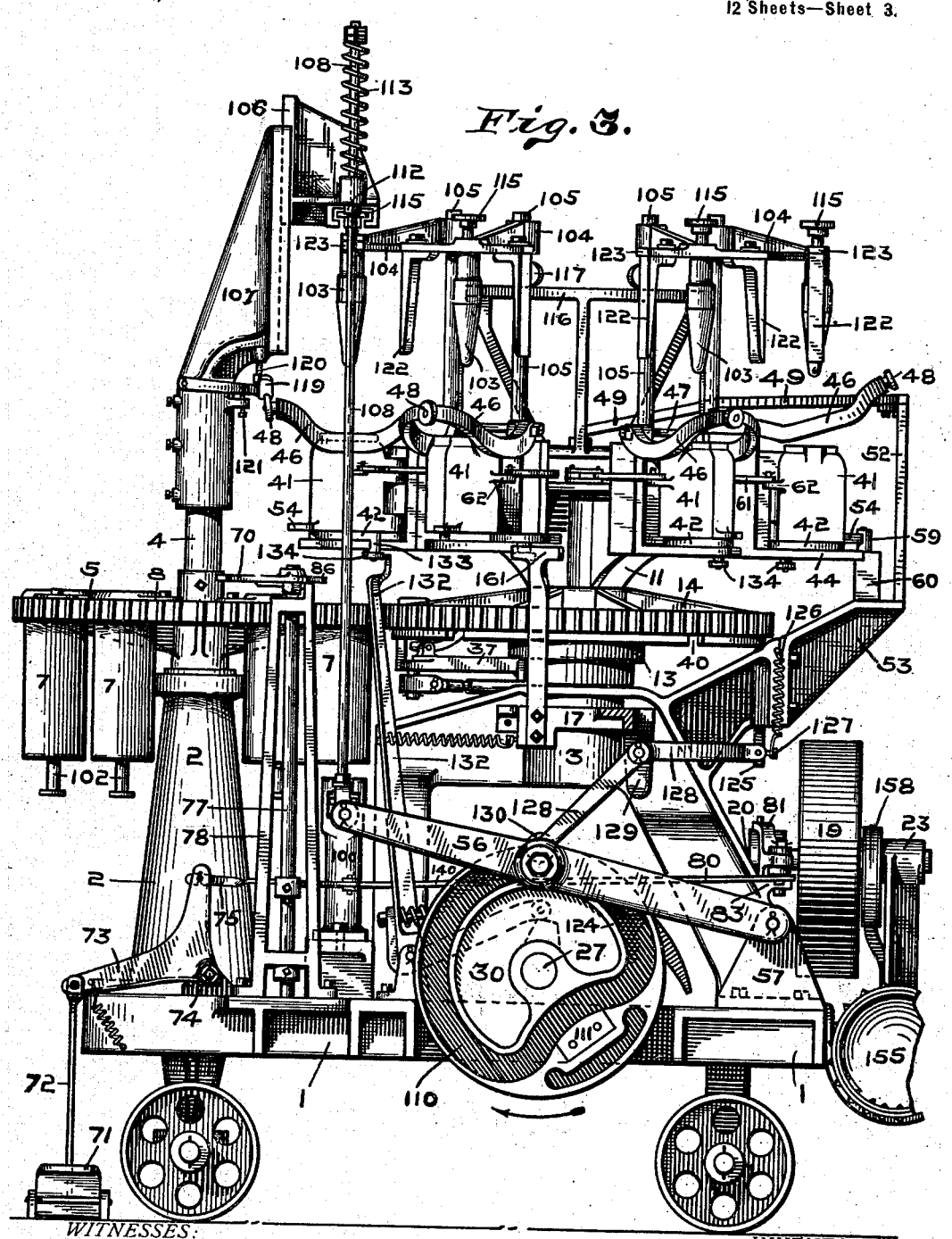
Figure 4:
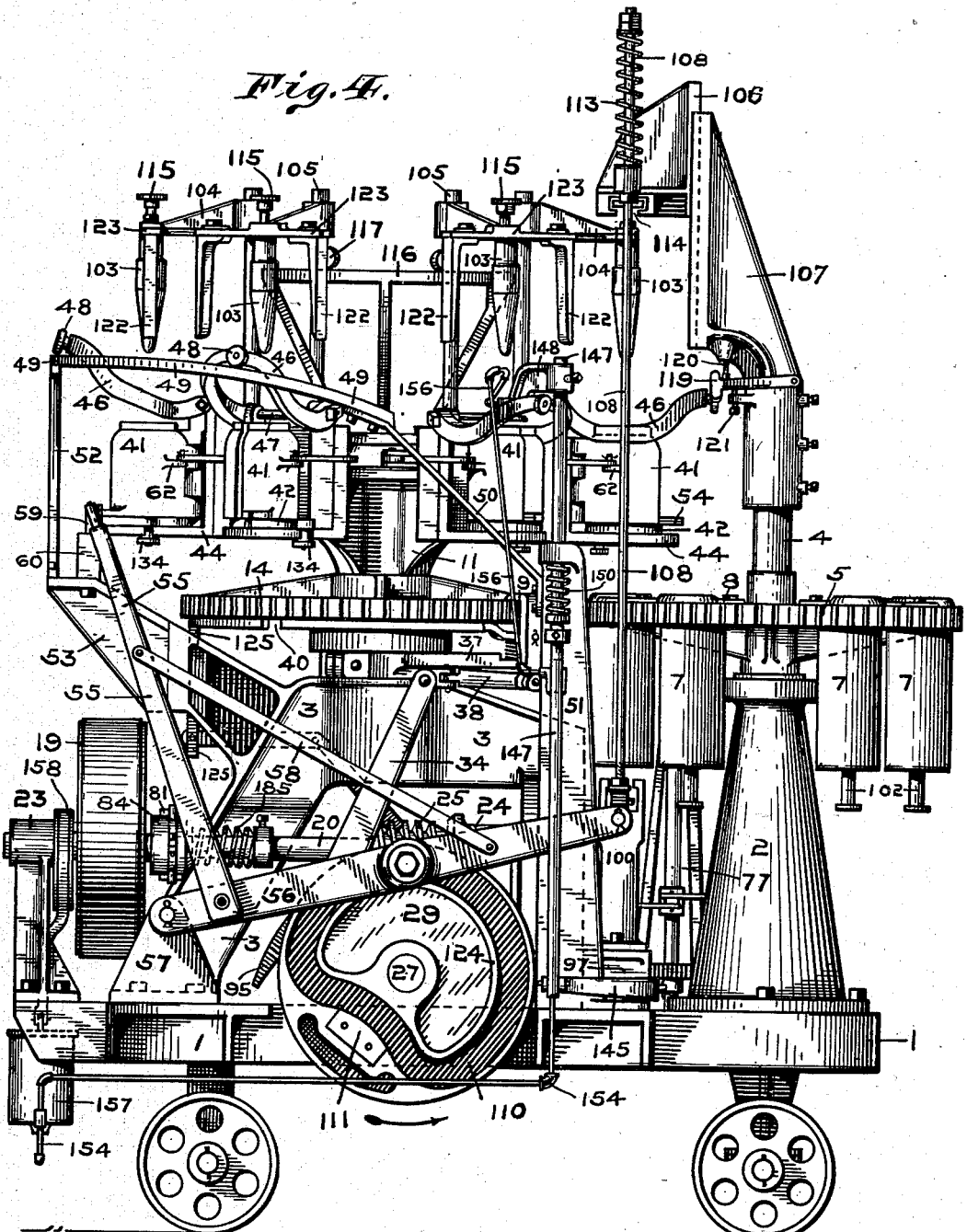
Figure 9:
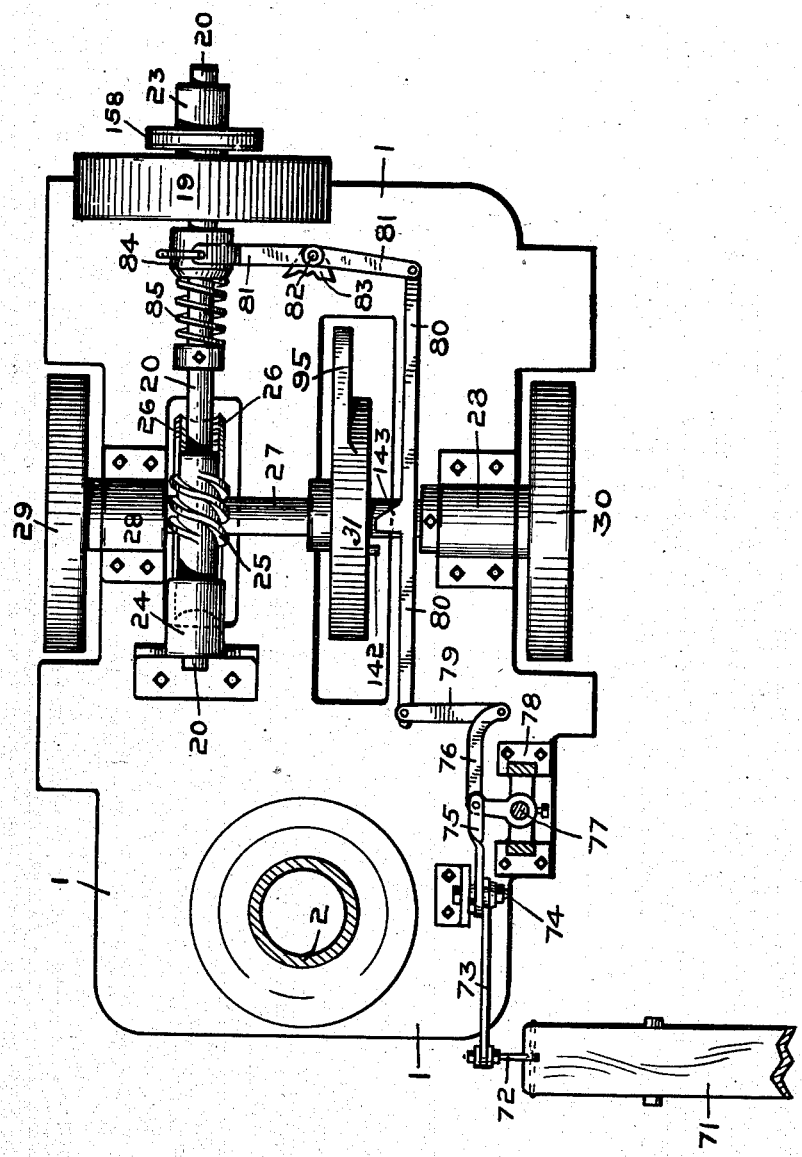
Figure 10:
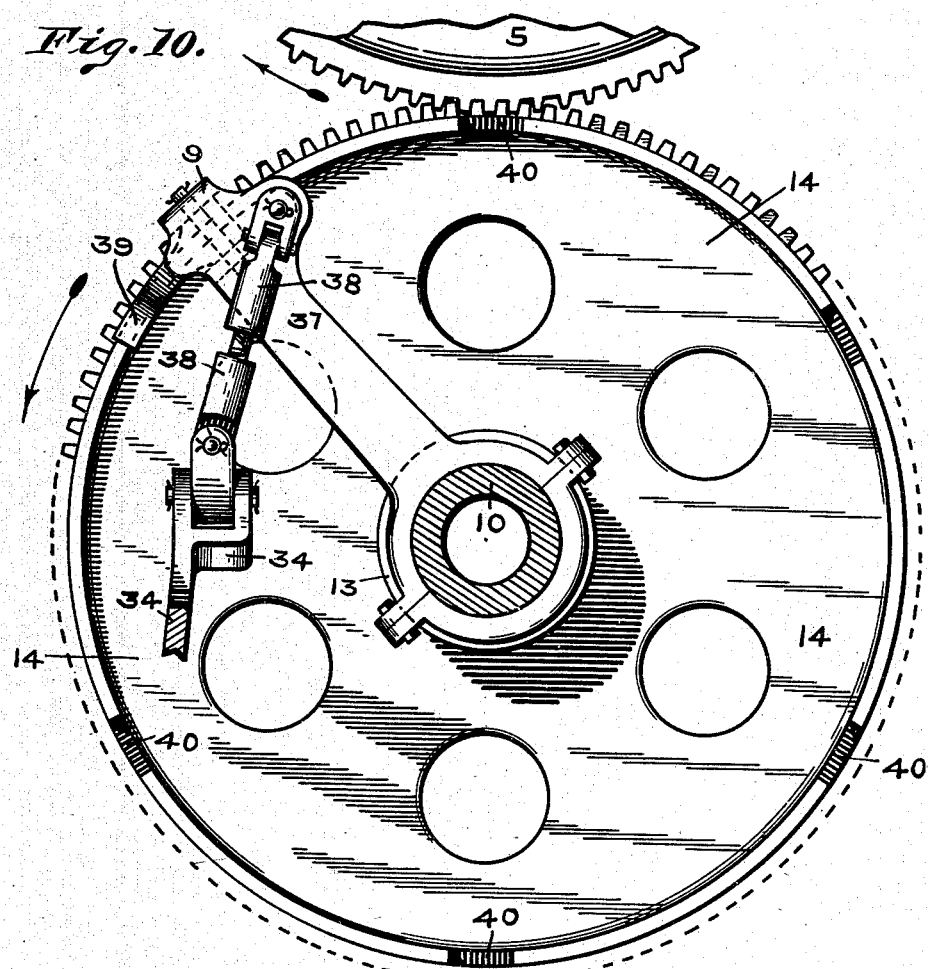
Figure 11:
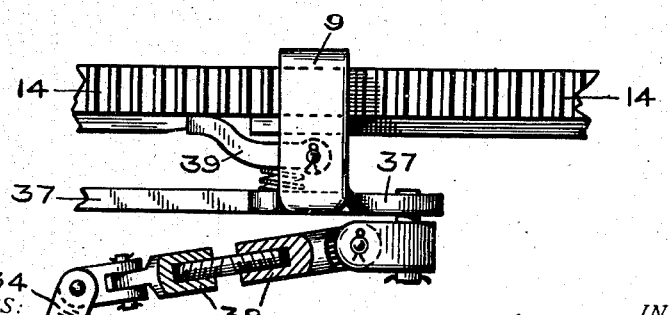
Figure 12:
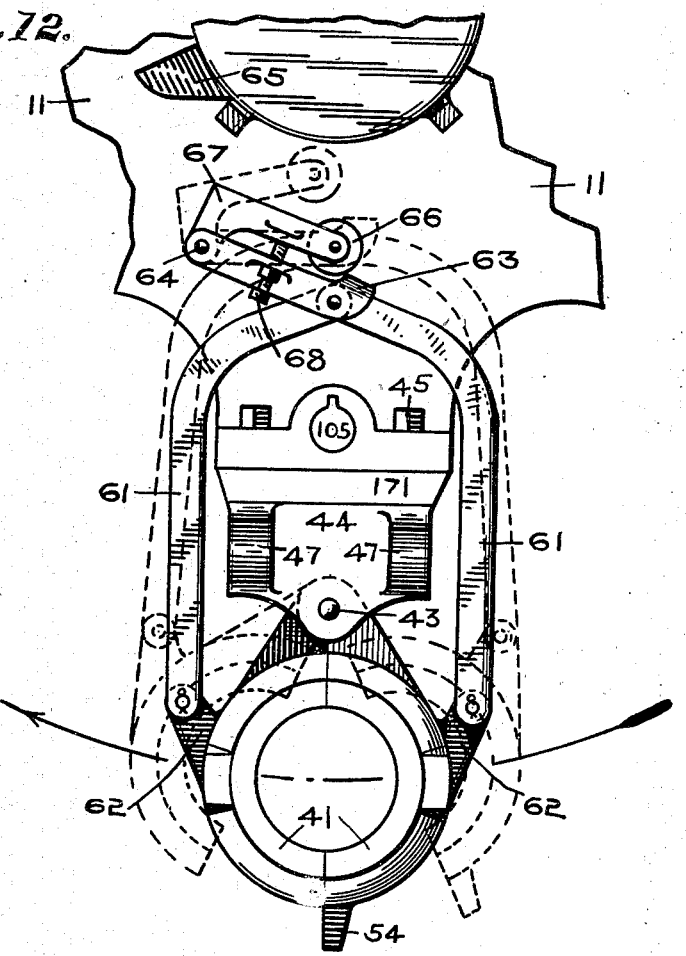
Figure 13:
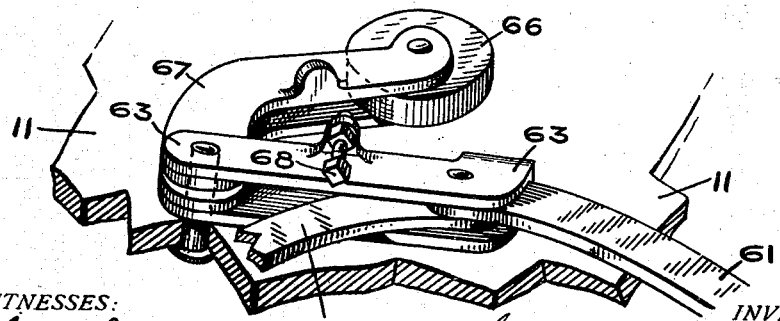
Figure 14:
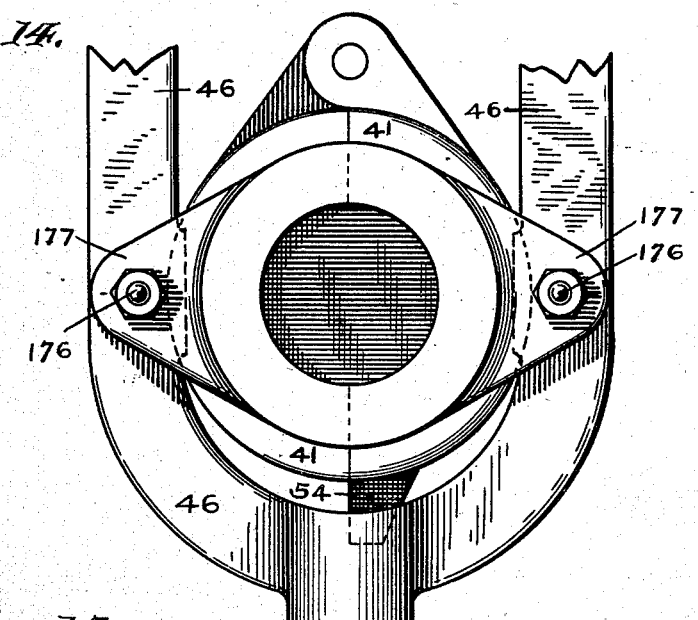
Figure 15:
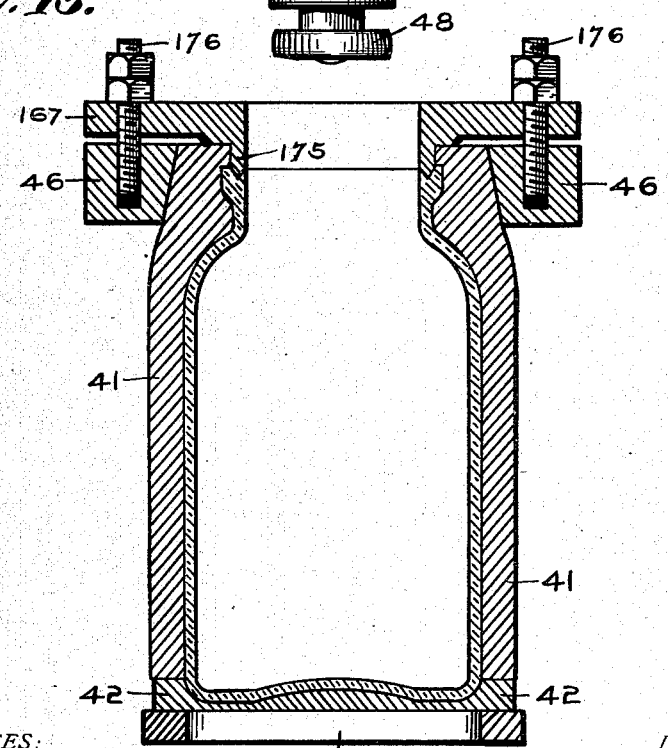

In the drawings, Figure 1 is a plan of the entire machine. Fig. 2 is a front elevation of the same. Fig. 3 is an elevation of the right side of the machine, omitting the electric motor and its mounting and a part being broken away in the rear. Fig. 4 is an elevation of the left side of the machine. Fig. 5 is a rear elevation of the machine. Fig. 6 is a central vertical section from front to rear of the machine on the line C C of Figs. 2 and 5. Fig. 7 is a vertical section from front to rear of the lower part of the machine on the line A A of Fig. 5. Fig. 8 is a similar section on the line B B of Fig. 5 with parts omitted. Fig. 9 is a plan of the base and some parts thereon to show the actuating and controlling means, parts being broken away and in section. Fig. 10 is a bottom view of the gear for rotating the molds, one gear being broken away and a part being in section. Fig. 11 is a side elevation of a portion of Fig. 10. Fig. 12 is a plan showing the details of the means for closing the blow-mold, parts being broken away. Fig. 13 is a perspective of a part of the mold-closing means when the mold is open. Fig. 14 is a plan of a modified arrangement including a ring for making a groove in the top of the article, a part being broken away. Fig. 15 is a central vertical section of what is shown in Fig. 14. Fig. 16 is a perspective of a modified means for holding the bottom of the blow-mold closed while in a blowing position, parts being broken away. Fig. 17 is a rear perspective of a portion of said means. Fig. 18 is a horizontal section immediately above the mold-bottom, parts being broken away to show the mounting of the mold-bottom.

In detail the machine herein illustrated for the purpose of explaining the general nature of my invention is mounted on a base or truck 1, supported by suitable wheels. Upon the forward portion of the base a column 2 is secured for supporting the receiving-mold mechanism and upon the base in the rear of said column 2 a stand 3 is secured for supporting the blow-mold mechanism. As appears in Fig. 6, the column 2 has secured in it a spindle 4, extending centrally upward from the column to carry the gear-wheel 5, which rotates around the said spindle and rests upon the upper end of the column 2. As appears in Figs. 1 and 6, the gear-wheel 5 carries the receiving-molds 6, that rest in a cylindrical casing 7, which is secured to the gear-wheel 5 by the ears 8. The receiving-molds 6 are insertible into the casing 7 from the top and are held therein by the inwardly-turned lip at the lower end of said casing, as is seen in Fig. 6.

A hollow spindle 10, preferably cast integral with the stand 3, extends upward from it, as appears in Fig. 6, and on it is mounted the spider 11, whose hub extends down and rests upon the washer 12, that is supported by the collar 13, secured to the spindle 10. A horizontal gear-wheel 14 is secured to the lower portion of the hub of the spider 11, so that the lower face of the hub of the gear 14 and of the hub of the spider 11 will be flush and rest upon the washer 12. The gear-wheel 14 meshes with and drives the gear-wheel 5, and said gear-wheel 14 is driven through the mechanism shown in Figs. 8, 10, and 11.

The driving mechanism of the machine is as follows: Referring to Fig. 5, an electric motor 15 is mounted on the machine by means of the brackets 16, bolted upon the base, as appears in Fig. 2, and also by a brace 17, running from the top of the motor across to the stand 3, to which it is secured. A belt 18 runs from the motor to the driving-wheel 19, mounted on the shaft 20, and has a tightener 21 mounted on the rod 22, that is secured to the base. The shaft 20 is carried by the bearing 23 and 24, the latter appearing in Fig. 2. As appears in Figs. 4 and 9, the shaft 20 has on it a worm 25, that engages with and actuates the worm-gear 26, as appears in Figs. 2 and 9. The worm-gear 26 is secured to the shaft 27, which is mounted in suitable boxes 28, secured to the base. The shaft 27 extends horizontally across the machine and carries three cam-wheels, 29 and 30 at its ends, and 31, which is near the center of the machine. It appears in Figs. 5, 6, and 9 and partly in Fig. 2.

The outside of cam 29 is shown in Fig. 4. The inside of it is shown in Fig. 8 and has a grooveway 32 in the form of an irregular ellipse, in which a roller 33 on the lever 34 moves for the actuation of said lever. The lever 34 is fulcrumed at 35 to the post 36, as appears in Figs. 5 and 8. The lever 34 is formed at its upper end, as appears in Fig 10, and is connected with the arm 37 by a double toggle 38. The arm 37 is loosely mounted on the lower part of the spindle 10, rising from the stand 3, as appears in Figs. 6 and 10. The outer end of the arm 37 has an upwardly-extending hook 9, that rides on the top of the gear-wheel 14, as is seen best in Fig. 4, and carries a spring-actuated pawl 39, as appears in Figs. 4, 10, and 11, that engages the under side of the gear-wheel 14 and propels said gear-wheel intermittently by engaging the notches 40, placed at equidistant points on the under side of the gear-wheel 14, which appears in Figs. 10, 11, and 4.

Since the gear-wheel 14 is secured to the spider 11, as appears in Fig. 6, the gear-wheel 14 revolves the series of blow-molds 41, carried by said spider. These blow-molds consist of three parts—two side sections and a bottom 42. The two sides of the mold are pivoted on the pin 43, secured to the bracket 44, and the bracket 44 is secured through the plate 171 to the arms of the spider 11 by the cap-screws 45. The bracket 44 has an extension at its lower end to support the bottom 42 of the mold, said bottom being pivoted near its inner end to the bracket 44, so as to be horizontally movable thereon. This extension of the bracket 44 has a hole in it to guide the receiving-mold 6, as appears in Fig. 6, when said mold is elevated into the blow-mold.

The two sections of the blow-mold 41 are closed and locked in a closed position by the yoke 46, that is pivoted to the ears 47 on the bracket 44. The form of said yokes in side elevation is shown in Fig. 6 and in plan is shown in Fig. 1. The outer end of the yoke carries a roller 48, that rides upon the track 49. (Shown in Figs. 1 and 4.) The front end of the track 49 is mounted on the bar 50, fastened to the post 51, rising from the base of the machine, as appears in Fig. 4. The rear end of said track is mounted on the bar 52, that is secured to the arm 53, extending rearward from the stand 3, as appears in Figs. 4 and 5. The track inclines upward from the front end toward the rear, and the purpose of the track is to elevate the yokes 46 off the blow-molds to allow them to be opened. The yoke rests upon the inclined upper portion of the sections of the mold, and when not supported by the track 49 the weight of the yoke will press the two sections of the mold together and close the same and hold them firmly. The track 48 is located at the part of the machine where it is desired for the molds to be opened.

The blow-molds are opened by means engaging the lug 54, to be seen in Figs. 1, 4, and 12, which is secured to one section of the mold. The sections of the mold are first opened very slightly by the lever 55, secured rigidly at its lower end, as appears in Fig. 4, to the lever 56 on the left side of the machine, which in turn is fulcrumed to the short stand 57 from the base and is actuated by the outer face of the cam 29. A brace 58 extends from the lever 55 to the lever 56. As the forward end of the lever 56 moves downward the upper end of the lever 55 is thrown forward and comes in contact with the lug 54 and opens the mold very slightly for the purpose of cooling the article. The extent of the opening action of the lever 55 can be predetermined as desired by adjusting the lever 55.

The sections of the blow-mold are completely opened afterward by the lug 54 coming into engagement with the roller 59 on the block 60, mounted on the arm 53 from the main stand 3. The roller 59 pushes back one section of the mold, and that section opens the other section of the mold through the links 61. Said links are pivoted at one end to the ears 62 on the sides of the mold-sections and at the rear are pivoted to the small lever 63, which in turn is pivoted to the pin 64, secured to the spider 11, as appears in Figs. 1, 6, and 12. Said molds are closed by means of the cam-lug 65, secured to the upper end of the spindle 10 and extending horizontally and which engages the roller 66 on the end of the lever 67, that is pivoted to the pin 64. When such lever 67 is actuated by the cam 65, it engages the set-screw 68 in the lever 63 and pushes the free end of said lever, as well as the links 61, outward from the position shown at the top of Fig. 1 to that shown at the bottom or at the right-hand corner of the series of the blow-molds. The lug 65 is stationary and is placed at the point where it is desired to close the molds immediately preceding the introduction of the receiving-mold with the charge of glass therein.

As appears from the foregoing description and the drawings, the series of the receiving-molds and the series of blow-molds are so mounted that the lines of rotation of the two series are tangential, bringing one of the receiving-molds and one of the blow-molds *seriatim* in vertical alinement, as appears in Figs. 4 and 6.

In the operation of the machine the gatherer drops his glass into the receiving-mold, (shown in Fig. 1,) that is immediately below the knife 70, the machine at that time being out of gear and at rest. He then operates the pedal 71, (shown in Fig. 3,) which starts the machine by means of the following mechanism: The pedal 71 is connected by a rod 72 with a bell-crank 73, fulcrumed at 74 and with its other arm pivoted to the bar 75, which in turn is pivoted to the lever 76. Said lever 76 is secured to the vertical rod 77, which carries the knife 70. Said rod 77 is mounted in the knife-stand 78. The lever 76 at its extreme end is pivoted to the connecting-link 79, which is connected with the trip-rod 80 by a pin secured to the trip-rod and entering in the slot in the end of the link 79. The other end of the trip-rod 80 is connected with and supported by a lever-yoke 81, fulcrumed at 82 to the bracket 83, secured to the stand 3, as is seen in Fig. 5. Said yoke-lever straddles the clutch 84, which is feathered to the shaft 20 and is pressed by the spring 85 into engagement with the pulley 19, which is mounted loosely on said shaft 20.

The mechanism just described when the pedal 71 is operated throws the machine into gear. The trip-rod 80 is supported in place by its connections at each end, above described.

The knife consists of two blades, one of which is secured to the rod 77 and the other one, 86, is pivoted at 87 to the top of the knife-stand 78. The blade 86 is wide and has a slot 88 in it, through which a pin 89, secured to the arm 90 from the other blade, extends and operates. The rotation of the knife-shaft 77, acting on the arm 90 through the slot 88, causes the blade 86 to move across the mouth of the receiving-mold to a point about midway and coöperate with the other blade in cutting off the glass.

After the receiving-mold has been charged with glass and the machine thrown into operation by the gatherer, as has been explained, the gear-wheel 5, carrying the receiving-molds, will rotate until the receiving-mold just charged moves under one of the outer molds, as appears in Fig. 3. The molds will stop under the action of grooveway 32 in cam-wheel 29 and of the stop 125, and the further movement of the machine causes the receiving-mold to be elevated into the blow-mold, as shown in Fig. 6. This is done by means of the lever 91, which at 92 is fulcrumed to a part of the main stand 3 and near the middle carries the roller 93, which is actuated by the cam-wheel 31. This cam-wheel consists of a disk with two extensions 94 and 95 on one side thereof. The periphery of the extension 94 is eccentric, and the roller 93 on the lever 91 rides upon the surface of such extension 94 and passes through a grooveway between the two extensions 94 and 95. The lever 91 is elevated by the outer periphery of said eccentric extension 94 and is forcibly drawn down by the inner surface of the extension 95, said extension 95 having a projection beyond the periphery of the cam-wheel that rides over the roller 93 on the lever 91 to draw down said lever. The purpose of the extension 95 for drawing down said lever is to forcibly draw down the receiving-mold when it happens to stick. The outer end of the lever 91 carries the roller 96, which operates in a box 97 on the lower end of the sliding plate 98, that moves vertically in the guideway 99 on the front face of the stand 3. The post 100 is secured upon the box 97 of a diameter that will permit it to enter the case 7, as appears in Fig. 6, when it is desired to elevate the receiving-mold. The upper end of the post 100 is vertically slotted, the lower end of the slot 101 being enlarged to receive the screw 102, that is adjustably secured to the lower end of the receiving-mold 6. As the receiving-molds revolve the screws 102, extending down from each, successively pass through the slot 101 in the upper end of the post 100 and remain in the slot in said post, while the receiving-mold is under and in alinement with the blow-mold, as appears in Fig. 6. The screw 102 has a head on it, which lies in the enlarged portion of the recess 101, whereby the receiving-mold may be forcibly drawn downward in case it should stick. The movement of the receiving-mold is guided accurately by the case 7 below and the opening through the bottom of the bracket 44. As soon as the receiving-mold with its charge of glass is elevated into the blow-mold, as shown in Fig. 6, the plunger 103 descends into said mold and presses the glass to form the article partially. Said plunger is carried by a horizontal arm 104 on the vertical rod 105, that extends through and is guided by the arm of the spider 11, said rod being feathered to prevent its rotation. Said plunger is depressed forcibly by the cross-head 106, that is vertically movable in a guide 107, which is secured on the upper end of the spindle 4, as appears in Figs. 4 and 6. The cross-head is actuated through the rods 108 and levers 56 by the cam-wheels 29 and 30. Each lever 56 has a roller 109, that moves through a grooveway 110 in the outer face of said cam-wheel. Said grooveway extends about the periphery of the wheel for about two-thirds of the distance and then turns in toward the center. I secure convex steel bearing-blocks 111 to the sides of the cam-wheels 29 and 30 at the point where the strain comes on the roller 109 during the pressing of the glass in the molds. The rods 108 are not rigidly secured to the cross-head, but movably secured, there being nuts 112 on said rods below the cross-head to limit the downward movement and the springs 113 above to permit a yielding of the plunger when necessary while the pressing is going on. A T-slot 114 is made on the under side of the cross-head, through which the T extension 115 on the upper end of the plunger passes during the rotation of the plungers. This enables the cross-head to elevate the plunger and also to hold the plunger suspended. The plungers are supported in an elevated position after they have been elevated by the cross-head and the machine again started by the circular track 116, secured on the upper end of the spindle 10, as appears in Fig. 6. A roller 117 is rotatably secured to the rod 105, that carries the plunger, and said roller travels on said track and is supported thereby excepting when the plunger is in alinement with a pair of the blow-molds and receiving-molds, as shown in Fig. 6. At that point the track 116 is cut away at 118 or vertically slotted to permit the downward movement of the roller 117. When the plungers in their rotation arrive at the pressing position and before they are depressed, they are supported by the cross-head and not by the roller 117.

During the pressing operation the yoke 46 is held down securely on the sections of the mold by the inclined under face of the yoke-stop 119, that is pivoted to the guide 107, as appears in Fig. 3. The position of said bearing-surface is adjusted by the set-screws 120 and 121. In order to cause the plunger to move down absolutely centrally with the blow-mold and receiving-mold for partially pressing the glass and forming the neck, I provide a pair of guide-bars 122, one on each side of the plunger, with the faces next to the plunger inclined or flaring somewhat, so that said bars will pass on each side of the yoke 46. Said guide-bars are attached to a cross-bar 123, secured on the arm 104, that carries the plunger.

The cams 29, 30, and 31 are so mounted on the shaft 27 with relation to each other as to bring about the desired relative movement of the receiving-mold and plunger. The pressing operation is carried on while the roller 93 on the lever 91, supporting the receiving-mold, is riding over the outer periphery of the extension 94 on the cam-wheel 31, as appears in Fig. 6, and at the same time the plunger is forced down to its limit by the convex surface of the blocks 111 on the cam-wheels 29 and 30 engaging the rollers on the levers 56, as seen in Figs. 3 and 4. By reference to these cam-wheels 29, 30, and 31 it is seen that as soon as the pressing operation is finished the plunger and receiving-mold are forcibly moved away from each other simultaneously by the extension 95 on the cam-wheel 31 engaging the roller 93 on the lever 91 and pulling down the receiving-mold and the elevating portions 124 of the cam-wheels 29 and 30, as shown in Figs. 3 and 4, forcibly elevating the levers 56, and thereby the plunger.

During the pressing operation the two gear-wheels 5 and 14 are stationary, being held so by the stop-rod 125, that moves vertically through a suitable opening in the rear arm 53 of the main stand 3, as appears in Fig. 6. Said stop-rod 125 when elevated engages one of the notches 40 on the under side of the gear 14, and it is elevated by the spring 126, (shown in Figs. 3 and 5,) with one end secured to the arm 53 of the main stand 3 and the other end fastened to the pin 127 on the end of the bell-crank lever 128, that is fulcrumed in a depending arm 129 from the bracket or arm 17. Said bell-crank 128 is actuated for releasing said stop by the cam-wheel 31, as appears in Fig. 7, where the right side of said cam-wheel is shown. As there appears, the crank 128 carries the roller 130, that rides on the right half of the periphery of the cam-wheel 31, and when it is in the position shown in Fig. 7 the stop-rod is out of engagement with gear 14. When the receiving-mold and blow-mold move into vertical alinement ready for pressing, the roller 130 on the lever 128 drops into the groove 131 in the right corner of the cam-wheel 31 and which extends about two-thirds of the way around said wheel, as appears in Fig. 7. Then the spring 126 acts to bring the stop-rod 125 into engagement with the gear-wheel 14 and lock said gear-wheel, as well as the gear 5, that carries the receiving-mold. The roller 130 moves through said groove 131 during the pressing operation, and after the pressing operation is ended said roller 130 rides up on the periphery of the cam-wheel 31 and disengages the stop-rod 125 from the gear 14 to permit the further movement of the gears 14 and 5. Immediately after the receiving-mold has descended away from the blank and out of the blow-mold the bottom of the blow-mold is moved into position to close said mold by the arm 132. (Shown in Figs. 3, 7, 5, and 2.) The bottom 42 of the mold has a depending arm 133 on one side, with a roller 134 mounted at its lower end, that is engaged by the upper end of the arm 132 and is moved forward, so as to swing said bottom from the open position to the closed position. It is shown in Fig. 2 in the process of being closed and is almost closed. Said arm 132 is moved forward at such time by the extension 135 on the right side of the cam-wheel 31, as appears in Fig. 7, engaging a roller 136 on one end of the bell-crank lever 137. The bell-crank lever 137 and the arm 132 are fulcrumed on the pin 138 in the stand 139, secured to the base. The other end of the lever 137 carries a blot 140, that works loosely through a flange on the arm 132, and a spiral spring 141 is mounted on said rod between the flange on the arm 132 and a nut on the end of the bolt 140. Constructed thus the bell-crank lever 137 will throw the arm 132 forward, and yet the upper end of said arm 132, if need be, can yield by reason of the spring 141. Gravity holds the roller 136 down on the extension 135 of the cam-wheel 31. As soon as the bottom of the blow-mold is moved into place the machine is stopped by the pin 142 on the right side of the cam-wheel 31, that engages the lug 143 on the trip-rod 80, as appears in Fig. 8, which through the lever 81 disengages the clutch 84 from the driving-pulley 19, and the machine comes to a dead rest until another receiving-mold is charged with glass and the gatherer operates the pedal 71. When the machine is started again with a new charge of glass, the spider 11 is rotated one-sixth of a revolution and carries the blow-mold which contains the blank of glass from the pressing to the blowing position. The blow-molds in this machine have grooves in the necks thereof to form the neck of the jar or other glass article, and the blank is held suspended in such mold by the neck thereof while it is being moved from the pressing to the blowing position. The pressing position is that of the lower central blow-mold, as appears in Fig. 1, and the blowing position is that of the first blow-mold to the left.

The means for blowing are shown in Figs. 1, 2, and 4. Referring first to Fig. 2, the front elevation of box 97, that is vertically movable for elevating the receiving-mold into the blow-mold, is shown with the laterally-extending lug 144, that when depressed engages the end of the lever 145, fulcrumed at 146 to the stand 51, which supports on its outer end the vertical rod 147, that is guided through the upper end of the stand 51, which at its upper end has secured to it the arm 148, that carries the blow-head 149 over the path of the blow-molds. As soon as the box 97 and other means for elevating the receiving-mold start upward from the position shown in Fig. 2 the spring 150, between the upper end of the stand 51 and the nut 151, depresses the blow-head upon the blow-mold, and the finger 152, that is secured to the rod 147, engages the stem of the valve 153 on the air-pipe 154. Said pipe 154 leads from the compressed-air reservoir 155, as appears in Fig. 5. The pipe 156 leads from the air-valve 153 to the blow-head, as appears in Fig. 4. While the receiving-mold is in its elevated position or, rather, while the box 97 is elevated out of engagement with the lever 145 the blowing of the article in the mold shown at the lower left corner of Fig. 2 is in progress. When the receiving-mold is moved downward and the box 97 depressed into position shown in Fig. 2, the finger 152 is elevated from the stem of the valve 153, and the air to the blow-mold is shut off and the blow-head elevated out of engagement to the blow-mold. Air is compressed in the tank 155 by means of the air-pump 157, driven by an eccentric-strap 158 on the eccentric 159, secured to the hub of the pulley 19. From the air-pump 157 a pipe 160 leads to the pipe 154 or in any other manner to the tank 155. The air-pump is secured to an extension from the base, as shown in Figs. 2, 4, and 5. During the next one-sixth rotation of the gear-wheel 14 the blow-mold containing the blown article is moved from the blowing position to the next or what may be called the "cooling" position, (shown in Fig. 4,) and in such movement the yoke 46 rides up on the track 49, and is thus disengaged from the section of the blow-mold to allow them to be opened. During the pressing operation of another glass article and while the plunger descends the lever 55 (shown in Fig. 4) will have its upper end moved forward into engagement with the lug 54 on one of the sections of the mold for slightly opening said mold, as appears in Fig. 4. During the next one-sixth rotation of the gear-wheel 14 said last-mentioned mold is moved from the cooling position to the removing position (shown at the upper end of Fig. 1) and opposite the pressing position. During such movement the roller 59 (shown in Fig. 1) at the rear end of the machine engages the lug 54 and through the links 61 opens the mold wide for the removal of the article, and the machine is at rest long enough for its removal while another mold is being charged, another article is pressed, another blown, and another cooled.

The blow-mold cools while passing from the removing position (shown at the upper end of Fig. 1) to the closing position at the right lower end of Fig. 1, and during such movement the sections of said mold are open. At the position where the sections of the mold are closed the bottom 42 of the mold is opened or turned backward by engaging the inclined face of the upper end of the bar 161, that is secured at its lower end to the arm 17, as appears in Fig. 5. In order to insure the bottom 42 of the mold being closed during the blowing process, I provide an arm 162, (shown in Fig. 5,) that is secured at its lower end to the stand 51 and is curved at its upper end to engage the roller 134, connected with the bottom of the mold, and force said bottom into a closed position just preceding the movement of the mold to the blowing position. If for any reason the bottom was not moved entirely into its right position by the upper end of the arm 132, the arm 162 completes the work and moves the bottom tightly into place before the article is blown, so that the bottom of the article will be properly formed.

From the foregoing description it will be observed that the same operation of parts is repeated during every one-sixth rotation of the gear-wheel 14, carrying the blow-mold. The beginning of each one-sixth revolution is caused by the gatherer operating the pedal 71, and the determination of each one-sixth revolution is caused by the pin 142 on the cam-wheel 31, as appears in Fig. 9, which engages the lug 143 on the trip-rod that disengages the clutch from the driving-pulley. When the machine is thrown into gear by actuation of the pedal, the lever 76 moves the trip-rod 80 laterally, and thereby moves the lug 143 out of the path of and out of engagement with the pin 142 on the cam-wheel, so that the spring 85 can throw the clutch into engagement with the driving-wheel.

In making what is called a "standard" fruit-jar, which has an annular groove on the upper end, in the machine constructed as that herein shown the ring 175, which extends downward into the mouth of the mold, as appears in Fig. 15, is secured to the yoke 46 by the screw-bolts 176, extending through laterally-extending ears 177 from said groove-forming ring 175. In such case the said ring moves into and out of place on top of the blow-mold along with the yoke. Therefore it is in place prior to the introduction of the plunger for pressing and remains in such position until after the article has been pressed and blown, and after being blown the article cannot be removed from the mold until said ring 175 is removed from the top of the mold, which is done by the elevation of the yoke through the roller 55, riding upon the track 49.

In Figs. 16 and 17 I have shown a modified form of means for closing the bottom of the blow-mold—a substitute for part 162. An arm 163 is secured to the stand 51 and extends inward beneath the path of the blow-molds. On one end of said arm a convex bar 164 is pivotally mounted, that is pushed forward by the spring 165, so as to keep the convex surface of said bar 164 in the path of the roller 134, extending down from the bottom 42 of the mold. As the mold is rotated in the direction of the arrow in Fig. 16 the roller 134 is engaged by the convex surface of the bar 164 and pushed outward, thereby closing the bottom of the mold. This will occur regardless of the condition or position of the bottom, whether open a little or open wide. The position of the bar 164 is such that it presses against the roller 134 while the mold is stopped in the blowing position, whereby the bottom is held tightly in place while the article is being blown. This is the position shown in Fig. 16. The stop 166 limits the outward movement of bar 164 as it engages the rear side of the arm 163. The advantage of this construction is that a yielding pressure is brought against the mold-bottom preliminary to and during the blowing of the article. It may be added that if the "parison" should fall down out of the mold and be caught on the bottom of the bracket 44, so as to prevent the closing of the mold-bottom, the bar 164 will yield and prevent the breakage of parts of the machine.

The nature of the operation of the machine will be understood from the preceding description, but to make the same plainer a brief statement thereof is made here.

Assuming the machine to be at rest, the gatherer charges the receiving-mold that is under the knife and then actuates the pedal for starting the machine. Immediately the knife cuts off the glass and the various parts of the machine begin to operate by the clutch being thrown into gear with the driving-pulley and continue to operate during the revolution of the shaft 27 and the cam-wheels 29, 30, and 31, which cause a one-sixth rotation of the gear-wheels carrying the molds and stop the rotation thereof under the action of the grooveway 32 in cam-wheel 29 and of the stop 125 and bring the receiving-mold that was charged into the pressing position and move it up into the corresponding blow-mold above and the plunger down for forming the neck of the article and partially forming the body thereof and the removal of the receiving-mold and plunger from the blow-mold and the moving of the bottom of the blow-mold into a closing position. Then the machine automatically stops with another receiving-mold in position under the knife for charging. The gatherer charges said second receiving-mold and again trips off the machine, whereupon the blow-mold containing the unfinished blank is moved from the pressing to the blowing position and the second receiving-mold charged is moved into the pressing position and the gear-wheel carrying the molds is stopped and locked, and while the second charge of glass is being pressed the first one is being blown, and after such pressing and blowing are finished the machine again automatically stops and comes to a rest for the third receiving-mold to be charged. The gatherer charges the third receiving-mold and trips off the machine, and while the receiving-mold containing the third charge is being moved into the pressing position the blow-mold containing the pressed blank from the second charge is being moved into the blowing position and the blown article from the first charge is being moved from the blowing position to the cooling position, and then the pressing of the third charge, the blowing of the second, and the partial opening of the blow-mold for cooling the blown article from the first charge are simultaneously taking place, and after such the machine again automatically comes to rest for charging the fourth receiving-mold. The gatherer then charges the fourth receiving-mold and trips the machine into operation. The fourth receiving-mold is moved into pressing position, the pressed blank from the third charge is moved into the blowing position, the mold from the blown article from the second charge is moved into the cooling position, and a mold containing the cooled blown article of the first charge is moved into the removing position and is removed while the fourth charge is being pressed, the third is being blown, and the second is being cooled, and after that the machine again comes to rest for charging the fifth receiving-mold. The gatherer charges the fifth receiving-mold and trips the machine into operation, and while said fifth receiving-mold is being moved to the pressing position the blow-molds are moved one-sixth of a revolution, which brings the blow-mold from which the finished article has been removed to the position for cooling the mold. The rest of the operation, heretofore described, takes place and then the machine comes again to rest for charging the sixth receiving-mold. After the sixth receiving-mold is charged and the machine is tripped into operation the blow-mold which received the first charge of glass is moved from the cooling position at the upper right corner of Fig. 1 to the closing position at the lower right corner of Fig. 1.

What I claim as my invention, and desire to secure by Letters Patent, is—

1. A machine for making hollow glassware, including molds, a horizontal gear for revolving said molds with a series of equidistant notches on the under side thereof, an arm pivotally mounted concentric with the gear on the under side thereof with its outer end turned up and riding upon the upper side of said gear, a pawl on said arm for engaging the notches on the under side of the gear-wheel, and means for oscillating said arm from one notch to the other on said gear, whereby the molds will be given intermittent revolving movement.

2. A machine for making hollow glassware including a base, a pair of stands or supports mounted on said base, a pair of intermeshing gear-wheels mounted horizontally above said stand or supports, a series of blow-molds revolved by one of said gear-wheels, a series of receiving-molds revolved by the other gear-wheel, and means for actuating one of said gear-wheels, whereby the use of intermediate gears between the said gear-wheels is avoided.

3. A machine for making hollow glassware including a vertically-movable receiving-mold, a lever for elevating and depressing said mold suitably fulcrumed and carrying a roller, and a rotary cam-wheel for actuating said lever having on one side an eccentric cam extension upon which said roller rides for elevating the mold and a hook-shaped extension for engaging said roller to depress it, whereby the mold will be forcibly moved down.

4. A machine for making hollow glassware including a sectional mold, a yoke for holding said mold closed, a plunger, and a pair of inclined guiding-arms secured on opposite sides of the plunger that are guided by said yoke for accurately centering the plunger in the mold.

5. A machine for making hollow glassware including a series of plungers, means for revolving them horizontally about a common center, and a vertically-movable cross-head over the pressing-point of the machine that receives holds and actuates said plungers in succession during the pressing operation.

6. A machine for making hollow glassware including plungers with a T extension on the upper end of each, means for revolving said plungers around a common center, and a vertically-movable cross-head with a T-slot over the pressing-point of the machine into which the T extension of each plunger enters and by which it is held during the pressing operation.

7. A machine for making hollow glassware including a plunger, a track for supporting said plunger in its upper position which has a gap at the pressing-point of the machine, means for revolving said plunger around the track, and a vertically-movable cross-head that receives and holds said plunger when it reaches the pressing-point in its revolution.

8. A machine for making hollow glassware including a plunger, a cross-head for holding and actuating the plunger during the pressing operation, a pair of rods for moving the plunger, a pair of levers pivoted at one end of said rods and fulcrumed at the other end and having rollers intermediate the ends, a shaft, and a pair of similarly-formed cam-wheels engaging the rollers on said levers for actuating the same.

9. A machine for making hollow glassware including a rotary spider, plungers, supports for the plungers vertically movable in said spider, a stationary circular track over the spider and within the series of plunger-supports that is cut away at the pressing-point of the machine, rollers extending from said plunger-supports that rest upon said track, and means for engaging and actuating each plunger as it reaches the pressing-point.

10. A machine for making hollow glassware including a plunger, a lever and connections for actuating said plunger for pressing the glass, a roller on said lever, and a rotary cam-wheel having a convex extension for passing over and depressing said roller during the pressing operation.

11. A machine for making hollow glassware including a plunger, a cross-head for actuating said plunger, rods connected with said cross-head, levers pivoted to said rods for actuating them that are fulcrumed at one end and have a roller intermediate their ends, and rotary cam-wheels having an extension a part of the periphery of which is substantially concentric with the cam-wheel and on which said rollers ride to maintain the cross-head and plunger elevated and another extension on said cam-wheels having a convex surface that rides over said rollers to depress the cross-head and plunger during the pressing operation.

12. A machine for making hollow glassware including a receiving-mold, a blow-mold over the receiving-mold, means for elevating the receiving-mold into the blow-mold and depressing it, a plunger over the blow-mold, means for depressing it into said molds and elevating it, a shaft, and cam-wheels secured thereon for actuating the means for moving the receiving-mold and the plunger, whereby the order and extent of their relative movements may be predetermined and will be positive and accurate.

13. A machine for making hollow glassware including blow-molds, receiving-molds, means for revolving the two series of molds so as to bring them successively into vertical alinement with each other, means for stopping the revolution of said molds when in vertical alinement, means for moving the receiving-molds up into the blow-molds, a plunger, means for actuating said plunger, a shaft, and cams secured thereon that actuate and control the means for revolving the molds, the means for locking the revolution of the molds, and the means for moving the receiving-molds vertically.

14. A machine for making hollow glassware including molds, a wheel for revolving the molds with notches on the under side thereof equidistant from each other, a vertically-movable bar for engaging said notches and stopping the rotation of the molds, a spring for actuating said bar, a lever for disengaging said bar from said wheel, and a rotary cam-wheel for actuating said lever having an annular groove into which the end of the lever drops while it is desired for the molds to remain stationary.

15. A machine for making hollow glassware including a mold, a bottom for the mold so pivoted that it swings horizontally into and out of place, a depending roller from said bottom, an arm fulcrumed at one end to engage said roller and close the bottom, a bell-crank lever fulcrumed at the same point, a rotary cam for actuating one end of said bell-crank lever, a yielding connection between the other end of the bell-crank lever and said arm, and a spring for holding said arm in its inoperative position.

16. A machine for making hollow glassware including a series of revolving blow-molds and a series of revolving receiving-molds that move successively into vertical alinement with each other, means for elevating the receiving-molds into the blow-molds, a blow-head, a valve-controlled air-pipe leading to said blow-head, a spring-actuated means for closing the blow-head upon the mold and actuating the air-valve, and a lever for disengaging the blow-head and releasing the air-valve that is actuated by the means for moving the receiving-mold when said means is returning to its inoperative position.

17. A machine for making hollow glassware including a blow-mold, a blow-head therefor, an air-pump, a pulley for driving the various parts of the machine, an eccentric on said pulley for actuating the air-pump, and a valve-controlled air passage-way leading therefrom to the blow-head.

18. A machine for making hollow glassware including a revolving mold formed of sections with a lug on one section, a lever, and means for actuating said lever for moving it into engagement with said lug for partially opening said mold.

19. A machine for making hollow glassware including a mold formed of sections with a lug on one section, a bell-crank lever mechanism one end of which engages said lug, and a rotary cam for actuating said lever mechanism for partially opening said mold.

20. A machine for making hollow glassware including a series of revolving molds, means for pressing the glass in one mold, means for blowing a partially-pressed article in another mold, means for partially opening another mold containing a blown article for cooling said article, and means for actuating the pressing, blowing, and opening means simultaneously.

21. A machine for making hollow glassware including a series of sectional blow-molds with a lug on one section of each mold, a plunger, means for actuating the plunger, and a lever mechanism that operates the plunger-actuating mechanism and engages said lug on the blow-molds partially opening one of said molds for cooling the article therein, whereby the pressing and cooling operations are simultaneous.

22. A machine for making hollow glassware including a series of revolving molds, means for pressing the glass in one mold, means for blowing a partially-pressed article in another mold, means for partially opening another mold containing the blown article to cool the same, a shaft, and cams secured thereon for actuating said means for pressing, blowing, and partly cooling the article, whereby the simultaneity and accuracy of the operations of said means are assured.

23. A machine for making hollow glassware including a series of sectional revolving molds with the upper part inclined on the sides, a yoke pivoted behind the molds which engages the inclined sides of the sections of the mold to hold the mold closed, and an inclined track in position to engage the outer ends of the yokes and lift them above the mold while the mold is being opened.

24. A machine for making hollow glassware including a sectional mold, means for revolving the same, means for intermittently stopping the revolution of the mold, means for partially opening the mold while in one position of rest for cooling the article therein, and means for completely opening the mold for the removal of the article in its next position of rest.

25. A machine for making hollow glassware including a mold formed of two sections pivoted together, means for revolving said mold, links or bars pivoted to the sides of the sections and extending inward and pivoted together, a bar pivoted to one end of said links at their pivotal point, another bar pivoted at one end to the other end of said first-mentioned bar, a roller on the free end of said last-mentioned bar, a set-screw in one bar adapted to engage the other bar, and an inclined stationary lug opposite the point for closing the mold that engages said roller and actuates said bars and links for closing the mold.

26. A machine for making hollow glassware including means for driving the machine, means for throwing the machine out of operation, a series of molds, means for revolving them, means for locking their revolution, a shaft actuated by the driving mechanism, and cam-wheels secured thereon that actuate the means for revolving the molds, and control the means for locking such revolution and throws the machine out of operation, whereby the order of such movements can be accurately predetermined.

27. A machine for making hollow glassware including means for driving the machine, means for throwing the machine out of operation, a series of molds, means for revolving them, a plunger, means for actuating the plunger, a shaft, and cams thereon that drive and control the mold-revolving means, the plunger-actuating means, and the means for throwing the machine out of operation.

28. A machine for making hollow glassware including means for driving the machine, means for throwing the machine out of operation, a series of blow-molds, means for partially opening each blow-mold after the article has been blown for cooling it, a shaft, and cams secured thereon for actuating such mold-opening means and the means for throwing the machine out of operation.

29. A machine for making hollow glassware including a driving-wheel, a clutch for throwing said wheel into and out of gear with the machine, a yoke-lever for actuating the clutch, a rod pivoted at one end to said yoke-lever with a lug thereon, a pedal, connection between the pedal and said rod for actuating it so as to throw the machine into operation, and a rotary cam-wheel driven by the machine with a pin thereon that in each revolution engages the lug on said rod and throws the machine out of operation.

30. A machine for making hollow glassware including a sectional blow-mold, a yoke for holding said blow-mold closed, and means for pressing down said yoke on said mold during the pressing operation so that the mouth of the mold will be held securely closed.

31. A machine for making hollow glassware including revolving blow-molds, a bottom pivotally connected with each mold to revolve therewith and adapted to swing into and out of place for closing said molds, and a stationary means extending into the path of the bottoms of said molds at the blowing position for engaging the bottom of each mold as it comes to the blowing position and holding it tightly closed during the blowing operation.

32. A machine for making hollow glassware including revolving blow-molds, bottoms pivotally connected with said molds to revolve therewith and adapted to swing into and out of place for closing said molds, and a yielding means mounted stationary below the series of molds and extending up into the path of the bottoms of said molds at the blowing position for engaging the bottom of each mold as it comes to the blowing position and holding it tightly closed during the blowing operation.

33. A machine for making hollow glassware including revolving blow-molds, bottoms pivoted to swing into and out of place for closing said molds with downward projections, a curved bar pivotally mounted with its convex surface in the path of the projections from the bottoms of the molds, a spring for pressing said bar against said projections, and a stop for limiting the movements of said bar.

34. A machine for making hollow glassware including a mold, a yoke for holding the mold closed during the pressing operation, and a ring mounted on the yoke that extends into the mouth of the mold to form the top of the article.

35. A machine for making hollow glassware including a mold, means for pressing and blowing the article therein, a yoke for holding the mold closed, a ring mounted on the yoke that extends into the mouth of the mold, means for holding the yoke and ring down during the pressing and blowing operations, and means for elevating the yoke and ring after the article is blown.

In witness whereof I have hereunto affixed my signature in the presence of the witnesses herein named.

GEORGE C. PYLE.

Witnesses:
   JENNIE M. TAYLOR,
   V. H. LOCKWOOD.